US008826398B2

(12) United States Patent  
Karp

(10) Patent No.: US 8,826,398 B2
(45) Date of Patent: Sep. 2, 2014

(54) PASSWORD CHANGING

(75) Inventor: Alan H Karp, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 80 days.

(21) Appl. No.: 13/248,494

(22) Filed: Sep. 29, 2011

(65) Prior Publication Data

US 2013/0086655 A1   Apr. 4, 2013

(51) Int. Cl.
*H04L 29/06* (2006.01)
*G06F 21/62* (2013.01)
*G06F 21/45* (2013.01)

(52) U.S. Cl.
CPC ............ *G06F 21/45* (2013.01); *G06F 21/6245* (2013.01)
USPC .......................................................... 726/6

(58) Field of Classification Search
USPC .......................................................... 726/6
See application file for complete search history.

(56) References Cited

U.S. PATENT DOCUMENTS

| | | | | |
|---|---|---|---|---|
| 5,995,624 | A * | 11/1999 | Fielder et al. ................ | 713/169 |
| 7,278,024 | B2 * | 10/2007 | Sundararajan et al. ....... | 713/183 |
| 2005/0238174 | A1 * | 10/2005 | Kreitzer ........................ | 380/277 |
| 2006/0069914 | A1 * | 3/2006 | Rupp et al. .................... | 713/168 |
| 2006/0236105 | A1 * | 10/2006 | Brok et al. .................... | 713/169 |
| 2007/0016796 | A1 * | 1/2007 | Singhal ......................... | 713/183 |
| 2007/0174904 | A1 * | 7/2007 | Park .............................. | 726/7 |
| 2007/0226783 | A1 * | 9/2007 | Mimlitsch ..................... | 726/4 |
| 2008/0276098 | A1 * | 11/2008 | Florencio et al. ............ | 713/183 |
| 2009/0125993 | A1 * | 5/2009 | Delia et al. ................... | 726/6 |
| 2009/0235346 | A1 * | 9/2009 | Steinberg ...................... | 726/8 |
| 2009/0241175 | A1 * | 9/2009 | Trandal et al. ................ | 726/7 |
| 2010/0100948 | A1 * | 4/2010 | Delia et al. ................... | 726/6 |
| 2010/0235897 | A1 * | 9/2010 | Mason et al. ................. | 726/7 |
| 2010/0299731 | A1 * | 11/2010 | Atkinson ....................... | 726/6 |
| 2011/0026716 | A1 | 2/2011 | Tang et al. | |
| 2011/0029436 | A1 * | 2/2011 | Norvell et al. ................ | 705/67 |
| 2012/0042363 | A1 * | 2/2012 | Moosavi et al. .............. | 726/5 |

FOREIGN PATENT DOCUMENTS

KR   20110054701   5/2011

OTHER PUBLICATIONS

Facebook Unveils New Temporary Password Security Feature; Caitlin Fitzsimmons on Oct. 12, 2010; Accessed http://allfacebook.com/facebook-unveils-new-temporary-password-security-feature_b20449 on Feb. 7, 2013.*
Does Facebook have temporary passwords? from Ask Dave Taylor!®; Oct. 21, 2010; Accessed Aug. 13, 2013; http://www.askdavetaylor.com/doesfacebook_havetemporary_passwords.html.*
Facebook Tightens Security with One-Time-Passwords; Tony Bradley; PC World; Oct. 13, 2010.*
Secure Password Entry Scheme in ATM Network which Is Resistant to Peeping Attacks; Divyans Mahansaria; International Journal of Engineering and Technology vol. 1, No. 2, Jun. 2009.*
"Check Out—One Time Passwords",https://www.thycotic.com/products_secretserver_checkout.html, Retrieved Jan. 20, 2012.
Blackshield—Tokens: Smart Phone Tokens, http://www.cryptocard.com/authentication-products/blackshield-tokens/49-tokens-for-phones/, Retrieved Jan. 20, 2012.
Florencio, et al; "One-time Password Access to Any Server without Changing the Server", http://research.microsoft.com/pubs/78026/1569113867_final_email.pdf.pdf, 2008.

* cited by examiner

*Primary Examiner* — Christopher Brown
*Assistant Examiner* — James Turchen

(57) ABSTRACT

In one example, a computing device generates a new password for accessing a user account and/or computing system and inspires a change of an existing password for the user account and/or computing system to the new password. Thereafter, the computing device detects occurrence of a condition to trigger another change of the password for the user account and/or computing system and, responsively, inspires another change of the password for the user account and/or computing system.

14 Claims, 10 Drawing Sheets

PASSWORD CHANGING

BACKGROUND

Passwords commonly are used as authentication mechanisms for logging-in to user accounts for on-line services. When a user logs in to a user account from an untrusted computing device, software and/or hardware that is configured to capture keystrokes may be installed on the untrusted computing device. Consequently, the password used to log-in to the user account from the untrusted computing device may be captured potentially compromising the security of the user account.

DETAILED DESCRIPTION

Figure 1A:
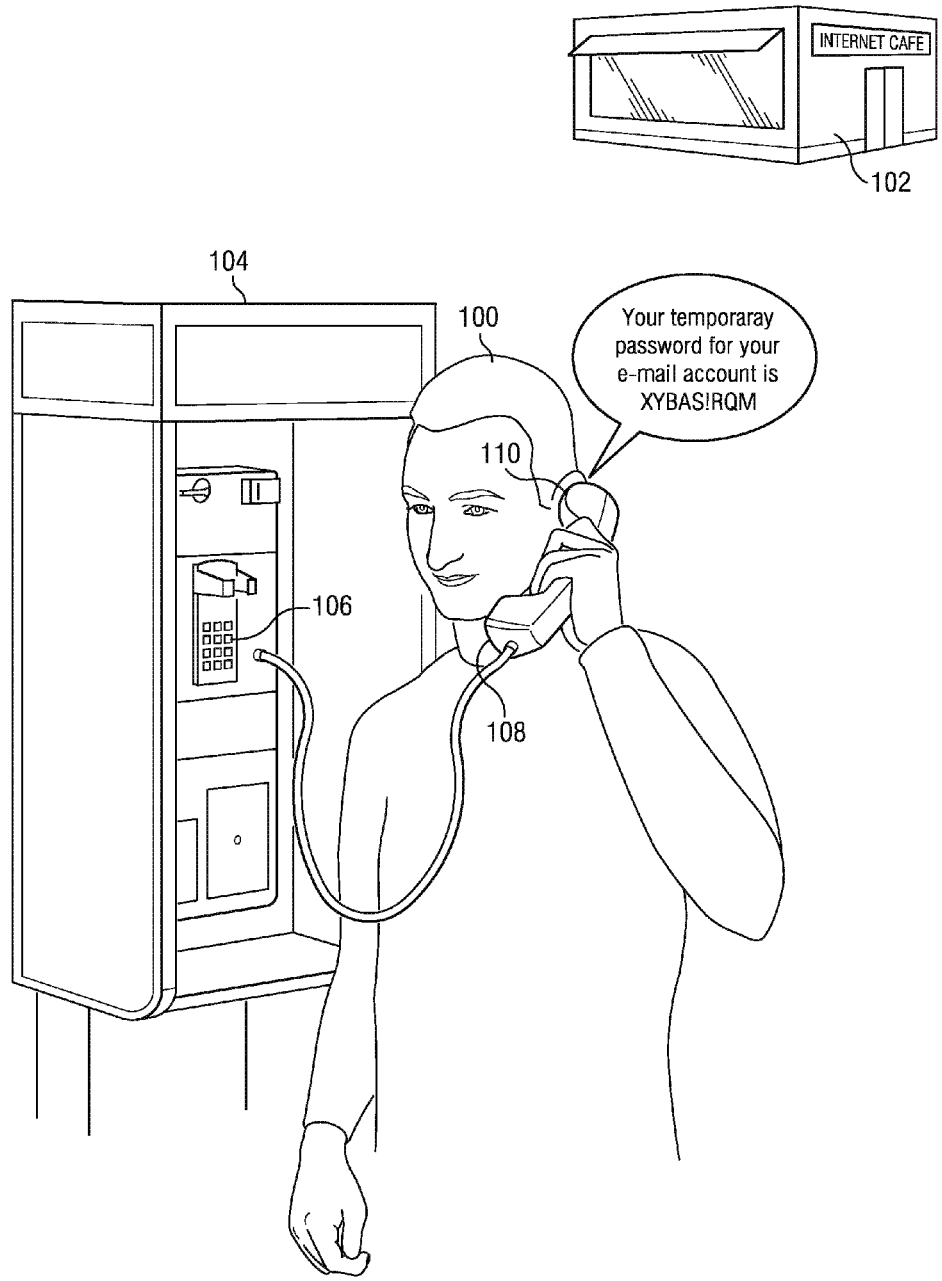
FIGS. 1A-1C and 2A-2D are schematic diagrams that illustrate examples of a password changing application in operation.

Techniques are described for establishing temporary (e.g., one-time) passwords for accessing remote computing systems and/or user accounts for on-line services hosted by remote computing systems without necessarily requiring any additional support by or modifications to the remote computing systems and/or on-line services hosted by such remote computing systems.

In one implementation, an application executing on a trusted user device receives a request from a user to establish a temporary password for a particular user account for an on-line service. In an alternative implementation, the application may execute on a host computer (e.g., a server) and receive the request to establish the temporary password for the particular user account from a user device over a network connection (e.g., the Internet, the public switched telephone network (PSTN), etc.). In response to receiving the request to establish the temporary password, the application generates a new, arbitrary password, which the application provides to the user, and initiates an automated routine to negotiate with the on-line service to change the user's existing password to the new, arbitrarily generated password. The user then may log-in to the user account for the on-line service from an untrusted device using the new password. Meanwhile, the application reinitiates the automated routine and negotiates the change of the user's password back to the user's previous password so that the user may use the previous password for subsequent log-ins to the user account for the on-line service. Consequently, even if malicious hardware or software installed on the untrusted device captures the password that the user uses to log-in to the user account for the on-line service, the captured password may not be valid for future log-ins to the user account for the on-line service.

Implementations in which the application executes on a host computer may enable a user to access the application and request the establishment of a temporary password for a particular user account from a variety of different types of devices including even some devices with relatively little or no compute power and/or devices without a live Internet connection. For example, in some implementations, a user may be able to access the application executing on the host computer and request the establishment of a temporary password for a particular user account by using a mobile or landline telephone to dial a specific telephone number corresponding to the host computer system and/or the application executing on the host computer system and entering an appropriate series of input using the keypad, spoken commands, or a combination of the keypad and spoken commands and/or by sending an appropriate short message service (SMS) text message to the specific telephone number. Additionally or alternatively, in such implementations where the application executes on a host computer, a user may be able to access the application and request the establishment of a temporary password for a particular user account from an Internet-connected user device by establishing an Internet connection between the user device and the host computer and/or the application executing on the host computer.

Figure 1B:
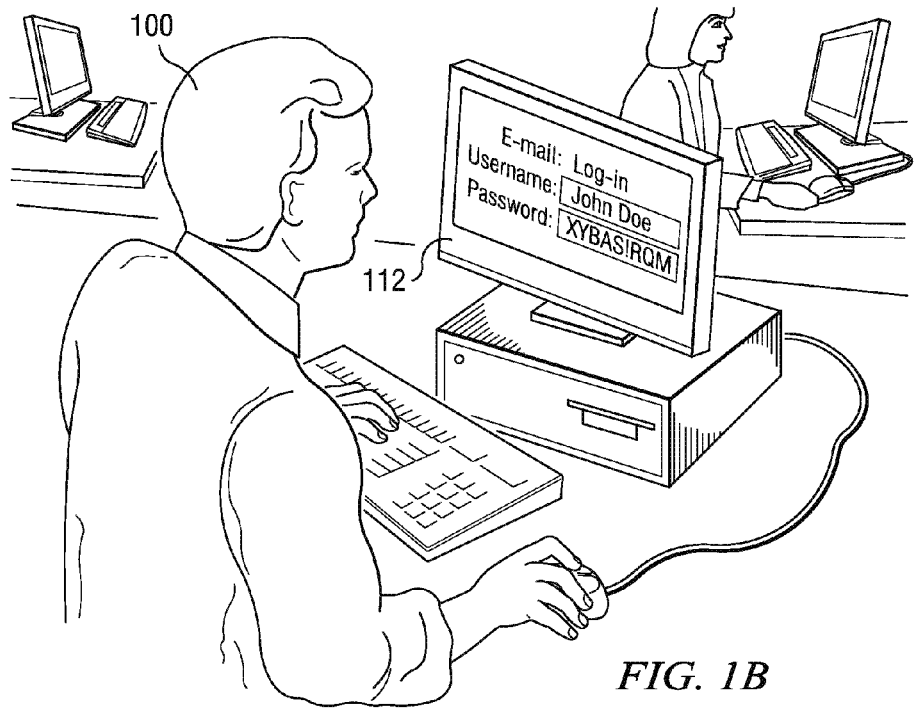
Figure 1C:
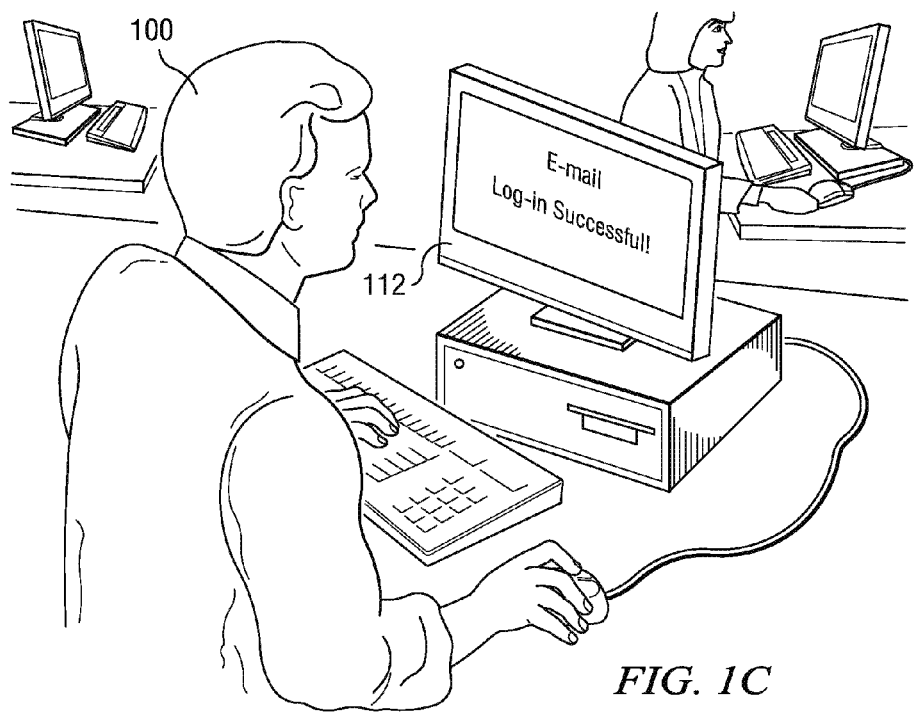

FIGS. 1A-1C are schematic diagrams that illustrate an example of a password changing application such as the one described above in operation. As illustrated in FIG. 1A, a user 100 is about to enter an Internet café 102 to use an untrusted computing device provided by the Internet café to check a web-based e-mail account. In order to protect against the risk of the user's password for his web-based e-mail account being captured by malicious hardware or software installed on the computing device provided by the Internet café, the user 100 uses a nearby fixed line payphone 104 to establish a telephone call connection with a host computer on which a password changing application is executing by dialing a specific telephone number associated with the password changing application. After the telephone call connection has been established with the host computer on which the password changing application is executing, the user 100 transmits an instruction to the password changing application over the telephone call connection to establish a temporary password for the user's web-based e-mail account, for example by entering an appropriate sequence of keystrokes on keypad 106 or by speaking spoken commands into telephone microphone 108.

In response, the password changing application generates a new password for the user's web-based e-mail account and initiates an automated routine to negotiate a change of the existing password for the user's web-based e-mail account to the new password with the computing system that hosts the web-based e-mail service, for example without the user 100 himself having to access his e-mail account and change the password. As illustrated in FIG. 1A, the password changing application also employs text-to-speech functionality to convert the new password into audio that then is spoken to the user 100 over the telephone call connection and through the telephone loudspeaker 110.

Referring now to FIGS. 1B and 1C, the user 100 then may enter the Internet café 102 and use the new password established by the password changing application to log-in to the user's e-mail account from an untrusted computer 112 provided by the Internet café. Meanwhile, in the background, the password changing application may again initiate the automated routine to negotiate with the computing system that hosts the web-based e-mail service to revert the password for the user's e-mail account to the user's previous password for the e-mail account. As a result, the password that the user 100 used to access his e-mail account from the untrusted computer 112 in the Internet café 102 may not be valid for subsequent log-ins to the user's e-mail account; and, in this manner, the risk of the security of the user's e-mail account being compromised by the capture of the user's password by malicious hardware or software installed on the untrusted computer 112 may be reduced.

Figure 2A:
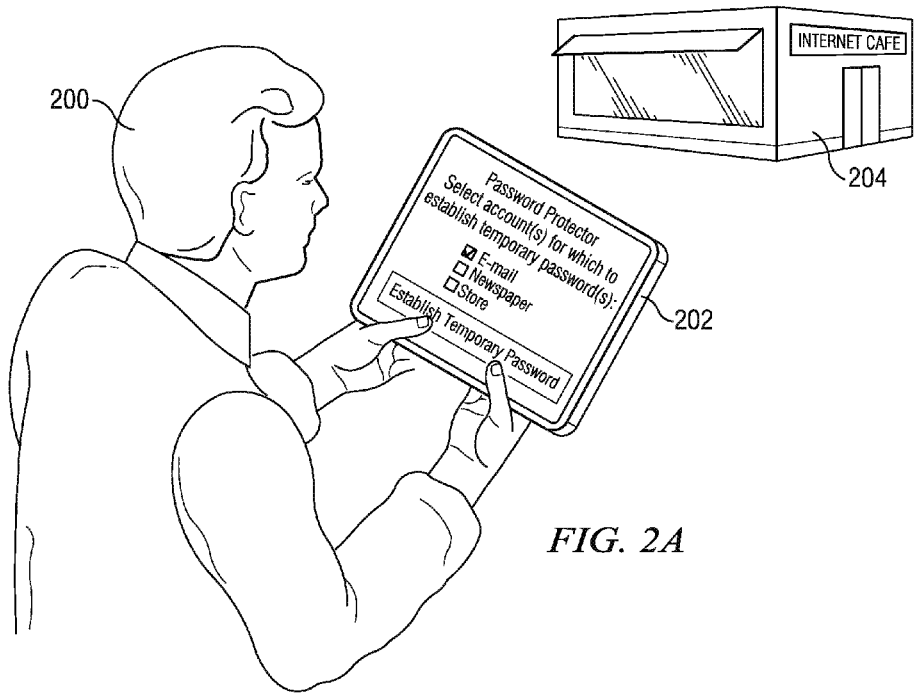
Figure 2B:
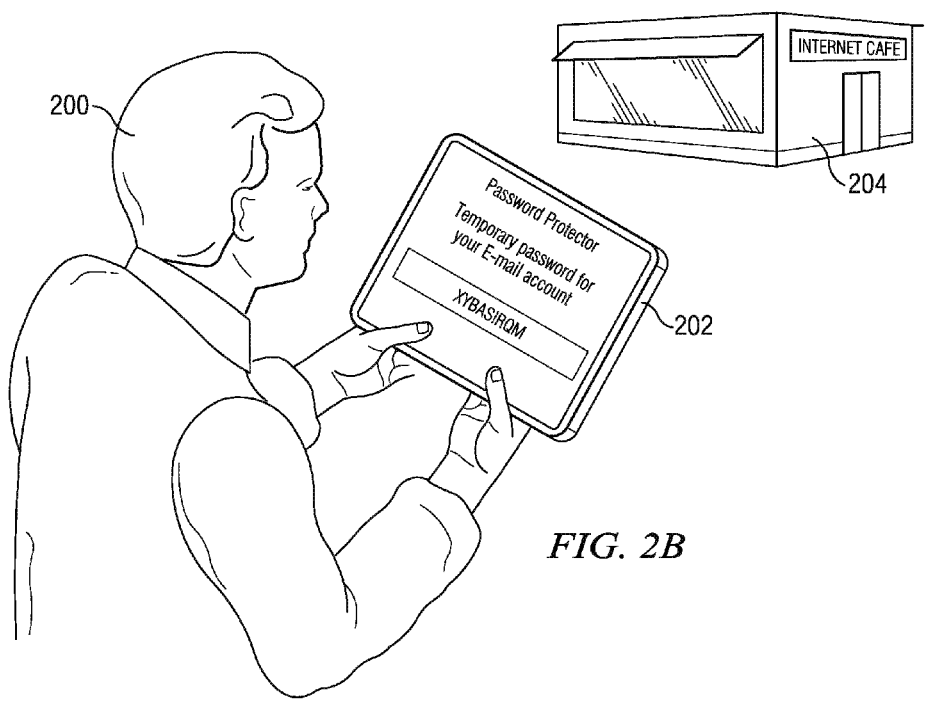

FIGS. 2A-2D are schematic diagrams that illustrate another example of a password changing application in operation. As illustrated in FIG. 2A, a user 200 of a mobile computing device 202 is about to enter an Internet café 204 to use an untrusted computing device provided by the Internet café to check a web-based e-mail account. In order to protect against the risk of the user's password for his web-based e-mail account being captured by malicious hardware or software installed on the computing device provided by the Internet café, the user 200 uses the mobile computing device 202 to request that a password changing application (executing locally on the mobile computing device or remotely on a host computer) establish a temporary password for the user's web-based e-mail account. In response, the password changing application generates a new password for the user's web-based e-mail account and initiates an automated routine to negotiate a change of the existing password for the user's web-based e-mail account to the new password with the computing system that hosts the web-based e-mail service, for example without the user 200 himself having to access his e-mail account and change the password. As illustrated in FIG. 2B, the password changing application also causes the new password for the user's e-mail account to be displayed on the mobile device 202.

Figure 2C:
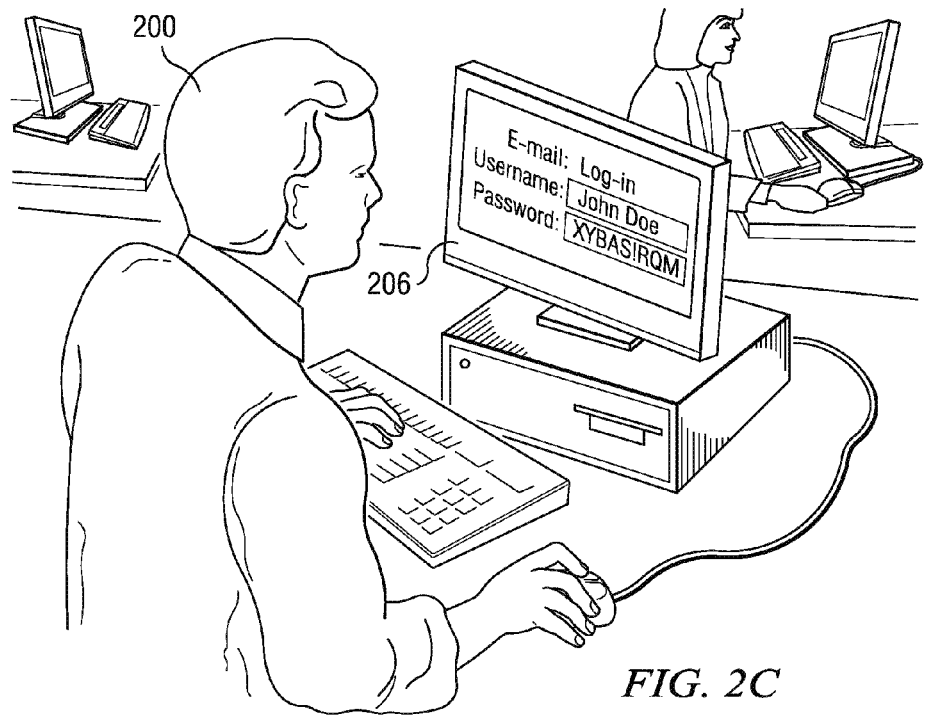
Figure 2D:
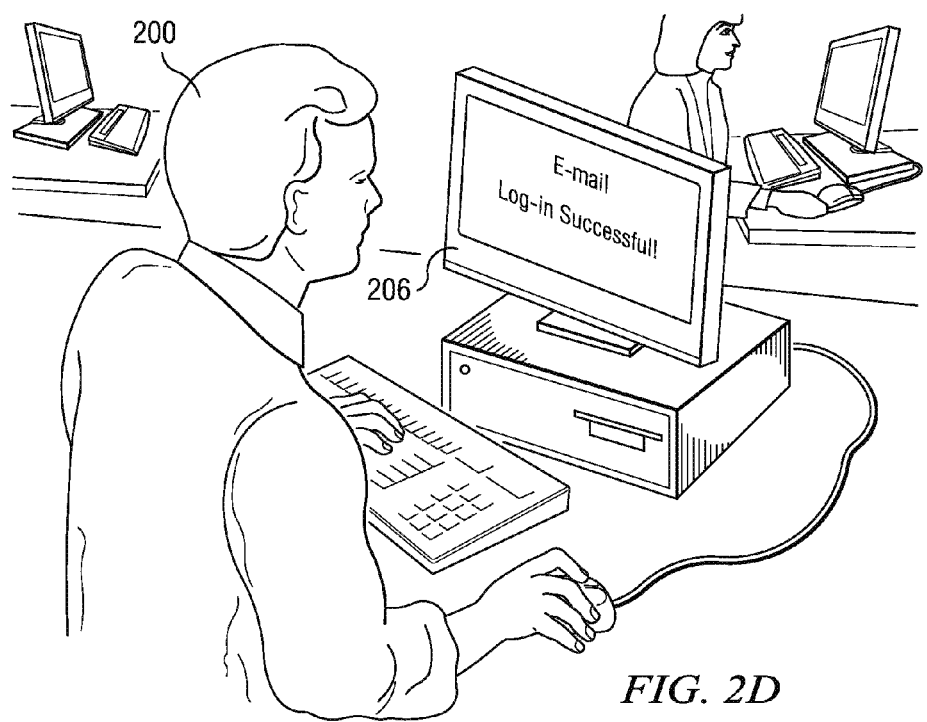

Referring now to FIGS. 2C and 2D, the user 200 then may enter the Internet café 204 and use the new password established by the password changing application to log-in to the user's e-mail account from an untrusted computer 206 provided by the Internet café. Meanwhile, in the background, the password changing application may again initiate the automated routine to negotiate with the computing system that hosts the web-based e-mail service to revert the password for the user's e-mail account to the user's previous password for the e-mail account. As a result, the password that the user 200 used to access his e-mail account from the untrusted computer 206 in the Internet café 204 may not be valid for subsequent log-ins to the user's e-mail account; and, in this manner, the risk of the security of the user's e-mail account being compromised by the capture of the user's password by malicious hardware or software installed on the untrusted computer 206 may be reduced.

Figure 3A:
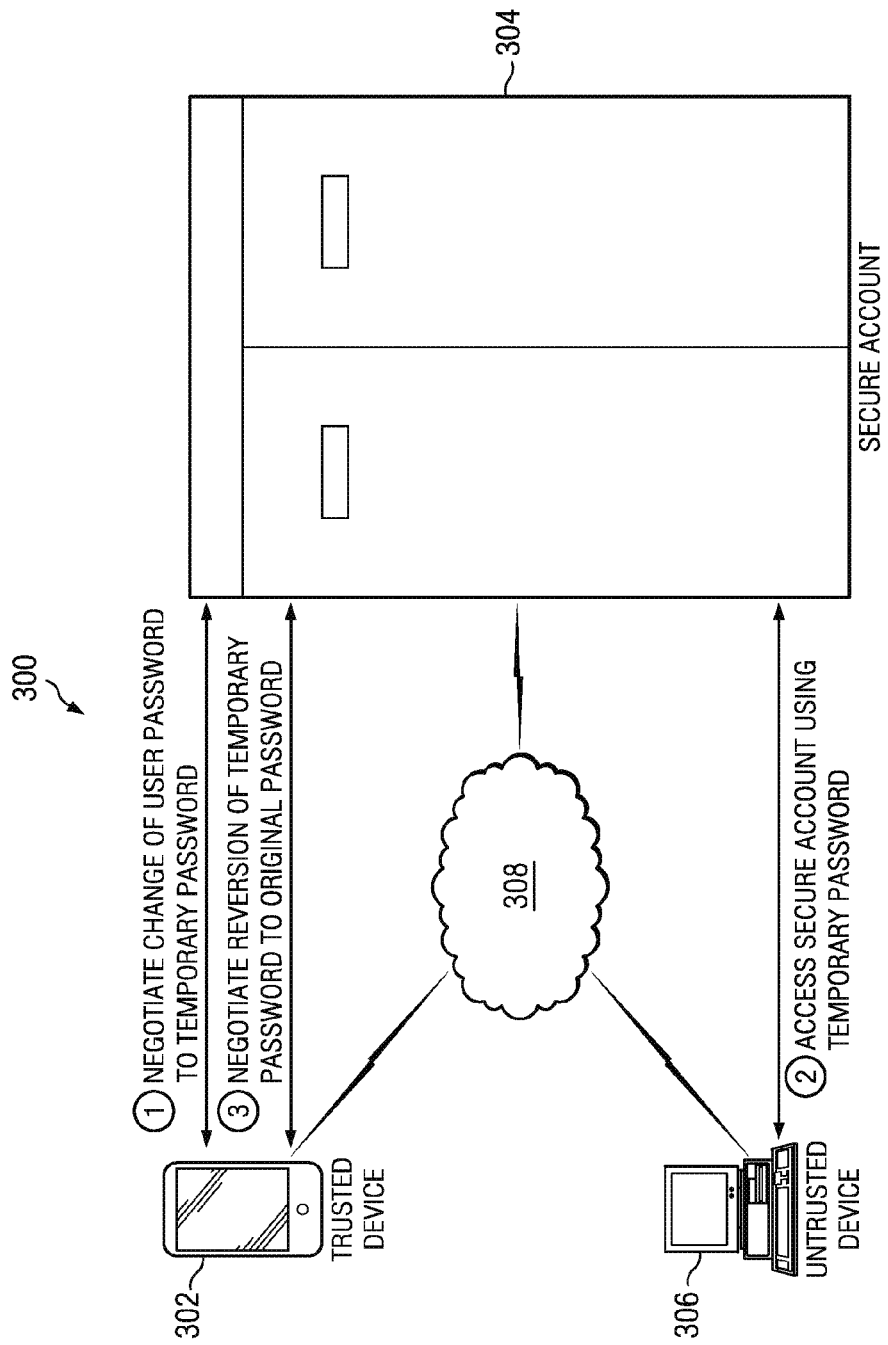
FIGS. 3A and 3B are block diagrams of examples of different architectures of network-connected devices.
Figure 3B:
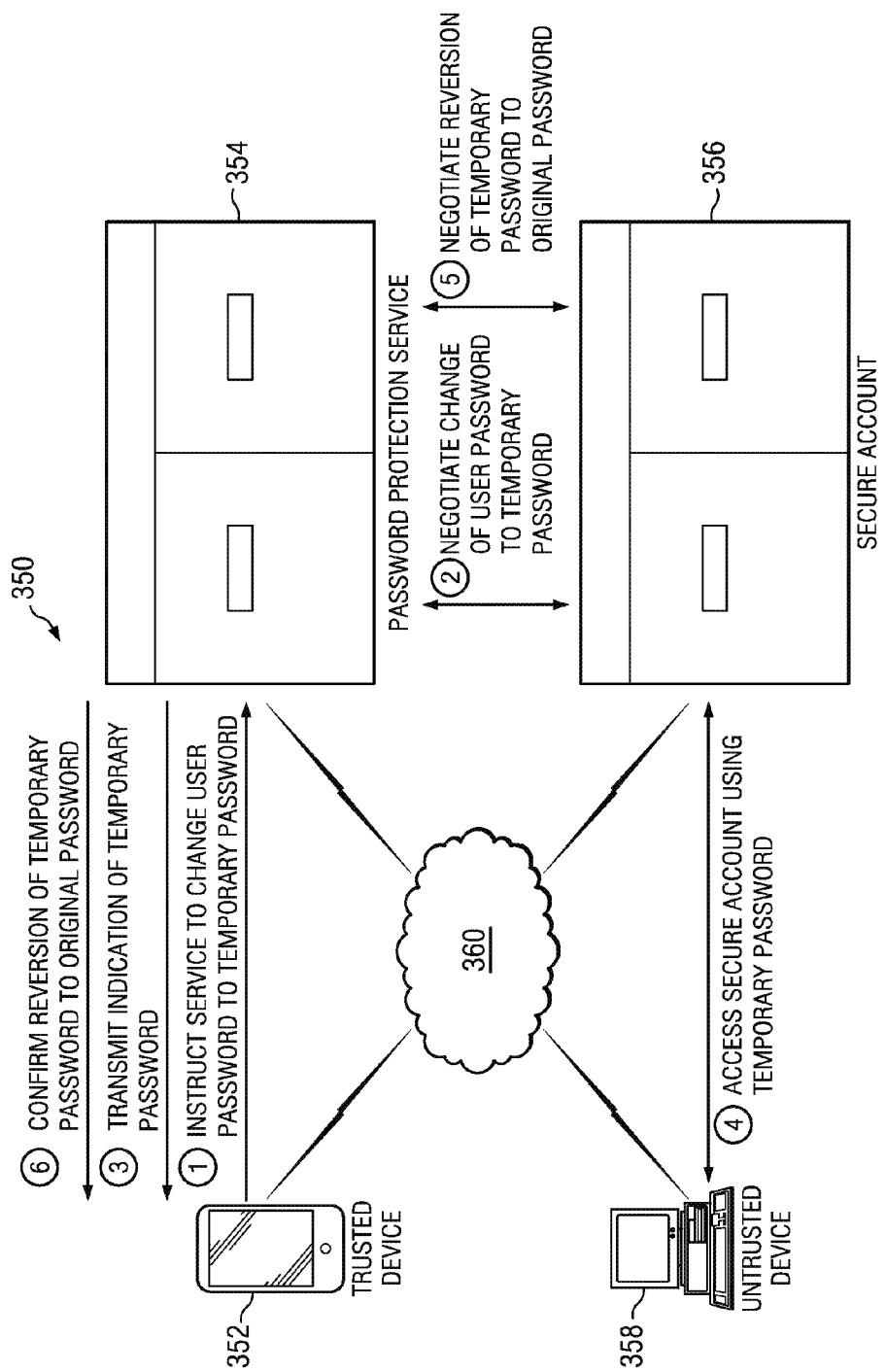

FIGS. 3A and 3B are block diagrams of examples of different architectures of network-connected devices that illustrate different techniques for establishing a temporary password for a secure account of a user. For illustrative purposes, several elements illustrated in FIGS. 3A and 3B and described below are represented as monolithic entities. However, these elements each may include and/or be implemented on numerous interconnected computing devices and other components that are designed to perform a set of specified operations.

Referring first to the architecture 300 illustrated in FIG. 3A, a trusted user device 302, a computing system 304 hosting an on-line service to which access is regulated through secure accounts, and an untrusted device 306 are communicatively coupled by a network 308.

Network 308 may provide direct or indirect communication links between trusted user device 302, computing system 304, and untrusted device 306. Examples of network 308 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data, as well as combinations of any of the foregoing.

Computing system 304 may be implemented using one or more computing devices (e.g., servers) configured to host a service that provides secure user accounts and that can be accessed from client devices (e.g., trusted user device 302 and untrusted device 306) connected to computing system 304 over network 308. The one or more computing devices on which computing system 304 is implemented may have internal or external storage components storing data and programs such as an operating system and one or more application programs. Furthermore, the one or more computing devices on which computing system 304 is implemented each may include one or more processors for executing instructions stored in storage and/or received from one or more other electronic devices, for example over network 308. In addition, the computing devices on which computing system 304 is implemented also typically include network interfaces and communication devices for sending and receiving data, for example over network 308. When executed by the processors of the computing system 304, the application programs stored in the storage components accessible to computing system 304 may operate to provide the service hosted by computing system 304, which includes regulating access to the secure accounts of the service.

Trusted user device 302 and untrusted device 306 may be any of a number of different types of computing devices including, for example, personal computers, special purpose computers, general purpose computers, combinations of special purpose and general purpose computers, laptop computers, tablet computers, netbook computers, smart phones, mobile phones, and personal digital assistants. Trusted user device 302 and untrusted device 306 may have internal or external storage components for storing data and programs such as an operating system and one or more application programs, for example, for use in accessing the service hosted by computing system 304. Trusted user device 302 and untrusted device 306 also typically include central processing units (CPUs) for executing instructions stored in storage and/or received from one or more other electronic devices, for example over network 308. Furthermore, trusted user device 302 and untrusted device 306 also usually include network interfaces and communication devices for sending and receiving data, for example over network 308.

The storage components accessible to trusted user device 302 store one or more application programs that, when executed by the one or more CPUs of trusted user device 302, enable trusted user device 302 to generate a new password for a user account for an on-line service (e.g., the service hosted by computing system 304) and to engage in an automated negotiation with the on-line service to automatically change the existing password for the user account for the on-line service to the newly-generated password. In fact, in some implementations, the application program(s) may enable the trusted user device 302 to generate new passwords for user accounts for multiple different on-line services and to engage in automated negotiations with multiple different on-line services to change passwords for user accounts for the different on-line services.

Different on-line services may have different policies for forming passwords that are valid for user accounts of the on-line services. For example, different on-line services may require that different numbers of letters, numbers, and/or special characters be included in a password, that a password start off and/or end with a certain type of character, and/or that a password adhere to a specified capitalization policy. Consequently, policies defining requirements for forming valid passwords for user accounts for different on-line services for which the application programs are operable to generate new passwords may be stored locally at (or otherwise be accessible to) the trusted user device 302, and, in order to generate a new password that is valid for a user account of a particular on-line service, the application program(s) may consult the corresponding password requirement policy for the particular on-line service as part of the process of generating the new password.

Different on-line services also may have different network addresses (e.g., uniform resource locators (URLs)), specify different procedures for user log-ins to user accounts for the on-line services, and/or specify different procedures for changing passwords for user accounts for the on-line services. In addition, a user of the trusted user device 302 may have different account identifiers (e.g., user names, account numbers, etc.) and/or different existing passwords for his/her user accounts for the different on-line services. Consequently, the network addresses and user account identifier and password pairs for different on-line services may be stored locally at (or otherwise be accessible to) the trusted user device 302 such that the application program(s) can use a particular one of the network addresses and an appropriate user account identifier and password pair to access a particular on-line service in order to negotiate a password change for the user account for the particular on-line service. Furthermore, the application program(s) may include different programs, modules, routines, etc. for different ones of the on-line services depending upon the specified procedures for logging-in to user accounts of the different services and/or the specified procedures for changing passwords for user accounts of the different services. Thus, when the application program(s) initiate an automated process to negotiate the change of a password for a user account of a particular on-line service, the application program(s) may select the appropriate program(s), module(s), routine(s), etc. for logging-in to a user account of the particular on-line service from among a collection of programs, modules, routines, etc. for logging-in to user accounts of different on-line services and/or the appropriate program(s), module(s), routine(s), etc. for changing a password for a user account of the particular on-line service from among a collection of programs, modules, routines, etc. for changing passwords for user accounts of different on-line services.

FIG. 3A illustrates one example of a workflow through which trusted user device 302 enables a one-time password scheme to be implemented for accessing a secure user account for the on-line service hosted by computing system 304, for example, from an untrusted device such as untrusted device 306. As illustrated in FIG. 3A, trusted device 302 first generates a new, temporary password (e.g., a one-time password) for the secure user account and then engages in an automated negotiation with computing system 304 to change the existing password for the secure user account to the newly-generated temporary password for the user account. Upon successfully changing the password for the secure user account from the previously-existing password to the newly-generated, temporary password, trusted device 302 may display (or otherwise make available) the newly-generated, temporary password for the secure account to a user of trusted device 302. Then, as illustrated in FIG. 3A, the user of trusted device 302 can use the new, temporary password for the secure account to access the secure account from untrusted device 306.

Finally, trusted device 302 engages in another automated negotiation with computing system 304 to change the new password for the secure user account back to the original password for the secure user account. In some implementations, trusted user device 302 may wait for some predefined period of time after negotiating with computing system 304 to change the password for the secure account to the newly-generated, temporary password for the secure user account before initiating the second automated negotiation with computing system 304 to change the password for the secure user account back to the original password for the secure user account. In alternative implementations, trusted user device 302 may wait until receiving some sort of user input before initiating the second automated negotiation with computing system 304 to change the password for the secure user account back to the original password for the secure user account. In either case, by changing the temporary password used to access the secure user account from untrusted device 306, trusted device 302 reduces the risk that the security of the user account can be compromised even if malicious hardware and/or software installed on untrusted device 306 captures the password used to access the secure user account from untrusted device 306.

Referring now to the architecture 350 illustrated in FIG. 3B, a trusted user device 352, a computing system 354 providing a password protection service (as described in greater detail below), a computing system 356 hosting an on-line service to which access is regulated through secure accounts, and an untrusted device 358 are communicatively coupled by a network 360.

Network 360 may provide direct or indirect communication links between trusted user device 352, computing system 354, computing system 356, and untrusted device 358. Examples of network 360 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data, as well as combinations of any of the foregoing.

Computing system 356 may be implemented using one or more computing devices (e.g., servers) configured to host a service that provides secure user accounts and that can be accessed from client devices (e.g., trusted user device 352, untrusted device 358, and computing system 354) connected to computing system 356 over network 360. The one or more computing devices on which computing system 356 is implemented may have internal or external storage components storing data and programs such as an operating system and one or more application programs. Furthermore, the one or more computing devices on which computing system 356 is implemented each may include one or more processors for executing instructions stored in storage and/or received from one or more other electronic devices, for example over network 360. In addition, the computing devices on which computing system 356 is implemented also typically include network interfaces and communication devices for sending and receiving data, for example over network 360. When executed by the processors of the computing system 356, the application programs stored in the storage components accessible to computing system 356 may operate to provide the service hosted by computing system 356, which includes regulating access to the secure accounts of the service.

Untrusted device 358 may be any of a number of different types of computing devices including, for example, a personal computer, a special purpose computer, a general purpose computer, a combination of a special purpose and a general purpose computer, a laptop computer, a tablet computer, a netbook computer, a smart phone, a mobile phone, and a personal digital assistant. Untrusted device 358 may have internal or external storage components for storing data and programs such as an operating system and one or more application programs, for example, for use in accessing the service hosted by computing system 356. Untrusted device 358 also typically includes one or more central processing units (CPUs) for executing instructions stored in storage and/or received from one or more other electronic devices, for example over network 360. Furthermore, untrusted device 358 also usually includes a network interface and communication device for sending and receiving data, for example over network 260.

Trusted user device 352 may be any of a number of different types of devices including, for example, a personal computer, a special purpose computer, a general purpose computer, a combination of a special purpose and a general purpose computer, a laptop computer, a tablet computer, a netbook computer, a smart phone, a mobile phone, a personal digital assistant, and a landline phone. Trusted user device 352 may have internal or external storage components for storing data and programs such as an operating system and one or more application programs, for example, for use in accessing the services hosted by computing systems 354 and 356. Trusted user device 352 also may include one or more central processing units (CPUs) for executing instructions stored in storage and/or received from one or more other electronic devices, for example over network 360. Furthermore, trusted user device 352 also may include a network interface and a communication device for sending and receiving data, for example over network 360.

Computing system 354 may be implemented using one or more computing devices (e.g., servers) configured to provide a password protection service that can be accessed from client devices (e.g., trusted user device 352) connected to computing system 354 over network 360. The one or more computing devices on which computing system 354 is implemented may have internal or external storage components storing data and programs such as an operating system and one or more application programs. Furthermore, the one or more computing devices on which computing system 354 is implemented each may include one or more processors for executing instructions stored in storage and/or received from one or more other electronic devices, for example over network 360. In addition, the computing devices on which computing system 354 is implemented also typically include network interfaces and communication devices for sending and receiving data, for example over network 360. These network interfaces and/or communication devices may enable computing system 354 to establish Internet connections with other computing devices, for example over network 360. Additionally or alternatively, these network interfaces and/or communication devices may enable computing system 354 to establish telephone call connections with other devices, for example over network 360.

The storage components accessible to computing system 354 store one or more application programs that, when executed by the one or more processors of computing system 354, implement the password protection service provided by computing system 354. As part of this password protection service, the application program(s) enable computing system 354 to generate new passwords for user accounts for multiple different on-line services, for example including the on-line service hosted by computing system 356, and to engage in automated negotiations with the on-line services to automatically change existing passwords for user accounts to the newly-generated passwords.

As discussed above, different on-line services may have different policies for forming passwords that are valid for user accounts of the on-line services. Consequently, policies defining requirements for forming valid passwords for user accounts for different on-line services for which the application program(s) generate(s) new passwords may be stored locally at (or otherwise be accessible to) computing system 354, and, in order to generate a new password that is valid for a user account of a particular on-line service, the application program(s) may consult the corresponding password requirement policy for the particular on-line service as part of the process of generating the new password.

Different on-line services also may have different network addresses (e.g., uniform resource locators (URLs)), specify different procedures for user log-ins to user accounts for the on-line services, and/or specify different procedures for changing passwords for user accounts for the on-line services. In addition, users of the password protection service provided by computing system 354 may have different account identifier (e.g., user names, account numbers, etc.) and password pairs for their user accounts for the different on-line services. Consequently, network addresses and user account identifier and password pairs for different on-line services may be stored locally at (or otherwise be accessible to) computing system 354. As such, when operating on behalf of a user of the password protection service provided by computing system 354 to change a user password for an account of the user with a particular one of the on-line services, the application program(s) can use a particular one of the network addresses and an appropriate user account identifier and password pair to access the particular on-line service in order to negotiate a password change for the user account for the particular service.

Furthermore, the application program(s) may include different programs, modules, routines, etc. for different ones of the on-line services depending upon the specified procedures for logging-in to user accounts of the different services and/or the specified procedures for changing passwords for user accounts of the different services. Thus, when the application program(s) initiate an automated process to negotiate the change of a password for a user account of a particular on-line service, the application program(s) may select the appropriate program(s), module(s), routine(s), etc. for logging-in to a user account of the particular on-line service from among a collection of programs, modules, routines, etc. for logging-in to user accounts of different on-line services and/or the appropriate program(s), module(s), routine(s), etc. for changing a password for a user account of the particular on-line service from among a collection of programs, modules, routines, etc. for changing passwords for user accounts of different on-line services.

FIG. 3B illustrates one example of a workflow through which the password protection service provided by computing system 354 enables a one-time password scheme to be implemented for accessing a secure user account for the on-line service hosted by computing system 356, for example, from an untrusted device such as untrusted device 358. As illustrated in FIG. 3B, trusted user device 352, for example in response to user input instructing trusted user device 352 to establish a temporary password for a secure user account of the service provided by computing system 356, first instructs the password protection service provided by computing system 354 to change the existing password for the secure user account to a temporary password. In some implementations, trusted user device 352 may instruct the password protection service provided by computing system 354 to change the existing password for the secure user account to a temporary password over a telephone call connection established between trusted user device 352 and computing system 354, for example, by way of spoken and/or touchtone input, or by sending an SMS text message to a telephone number corresponding to the password protection service provided by computing system 354. In response, the password protection service provided by computing system 354 then generates a new, temporary password (e.g., a one-time password) for the secure user account and engages in an automated negotiation with computing system 356 to change the existing password for the secure user account to the newly-generated temporary password for the user account.

Upon successfully negotiating the change of the password for the secure user account to the newly-generated, temporary password, the password protection service provided by computing system 354 transmits an indication of the newly-generated password for the secure user account to trusted device 352, which may display (or otherwise make available) the newly-generated, temporary password for the secure account to a user of trusted device 352. In some implementations, the password protection service provided by computing system 354 may transmit the indication of the newly-generated password for the secure user account to trusted user device 352 as an SMS text message. Additionally or alternatively, in implementations in which a telephone call connection may be established between trusted user device 352 and computing system 354, the password protection service provided by computing system 354 may use a text-to-speech application to generate an audio indication of the newly-generated password for the secure user account and, thereafter, transmit the audio indication of the newly-generated password to trusted user device 352 over a telephone call connection with trusted user device 352. Then, as illustrated in FIG. 3B, the user of trusted device 352 can use the new, temporary password for the secure account to access the secure account from untrusted device 358.

Meanwhile, the password protection service provided by computing system 354 engages in another automated negotiation with computing system 356 to change the new password for the secure user account back to the original password for the secure user account. In some implementations, the password protection service provided by computing system 354 may wait for some predefined period of time after negotiating with computing system 356 to change the password for the secure account to the newly-generated, temporary password for the secure user account before initiating the second automated negotiation with computing system 356 to change the password for the secure user account back to the original password for the secure user account. In alternative implementations, the password protection service 354 may wait until receiving an explicit instruction from trusted device 352 before initiating the second automated negotiation with computing system 356 to change the password for the secure user account back to the original password for the secure user account. In either case, by changing the temporary password used to access the secure user account from untrusted device 358, the password protection service provided by computing system 354 reduces the risk that the security of the user account can be compromised even if malicious hardware and/or software installed on untrusted device 358 captures the password used to access the secure user account from untrusted device 358.

Figure 4:
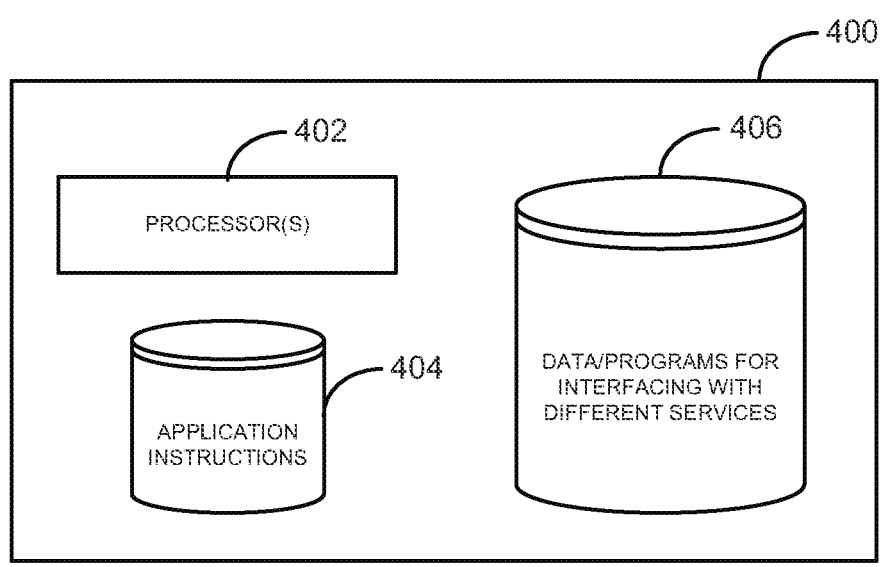
FIG. 4 is a block diagram of an example of a computing device.

FIG. 4 is a block diagram of an example of a computing device 400 for implementing user account password changing techniques as described herein. For example, computing device 400 may correspond to trusted user device 302 illustrated in FIG. 3A or computing system 354 illustrated in FIG. 3B.

As illustrated in FIG. 4, computing device 400 includes one or more processors 402, a computer memory storage system 404 storing application instructions, and computer memory storage system 406 storing data and/or programs for interfacing with different on-line services. When executed by processor(s) 402, the application instructions stored in computer memory storage system 404 cause computing device 400 to perform the various user account password changing techniques described herein.

As described herein, in some implementations, computing device 400 may be configured to generate new passwords for and to change passwords for user accounts for multiple different users. Consequently, computer memory storage system 306 may store user account information (e.g., account identifier and password pairs) for multiple different users. Additionally or alternatively, in some implementations, computing device 400 may be configured to generate new passwords for and to change passwords for user accounts for multiple different on-line services. Therefore, computer memory storage system 406 also may store network address information (e.g., URLs) and allowed password policies for each of the different on-line services with which computing device 400 is configured to interact as well as programs for automatically logging-in to and changing passwords for user accounts of the different on-line services with which computing device 400 is configured to interact. In some implementations, computer memory storage system 406 may store separate programs for logging-in to and changing passwords for user accounts of each of the different on-line services with which computing device 400 is configured to interact. In alternative implementations, multiple different on-line services with which computing device 400 is configured to interact may follow the same protocols for logging-in to and changing passwords for user accounts, and computer memory storage system 406 may instead store only one program for logging-in to and changing passwords for user accounts of such similarly-configured on-line services.

Figure 5:
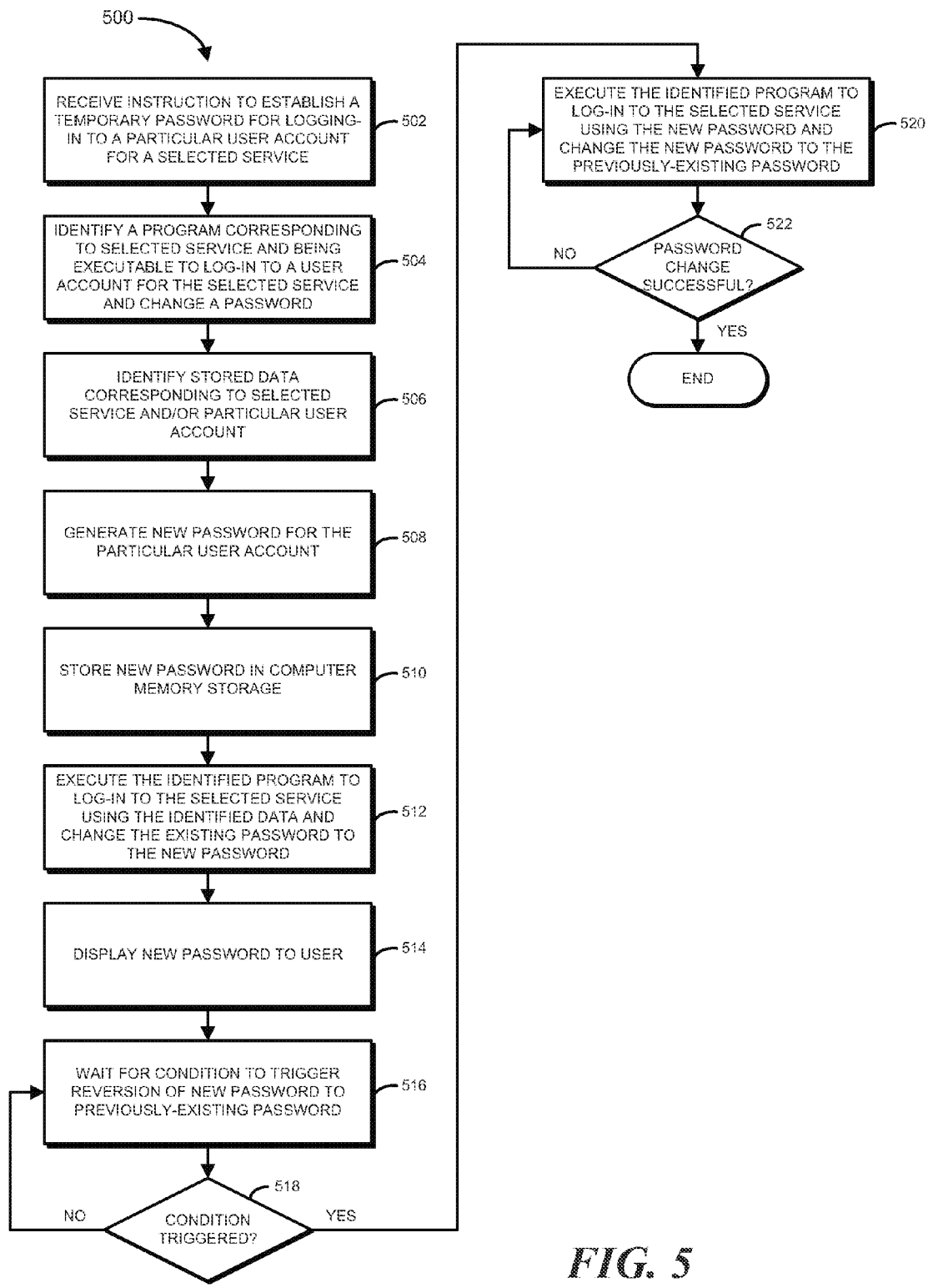
FIGS. 5-7 are flowcharts illustrating examples of processes for changing passwords.

FIG. 5 is a flow chat 500 illustrating an example of a process for changing passwords for a user account for an on-line service. The process illustrated in the flowchart 500 of FIG. 5 may be performed by a computing system such as the trusted user device 302 illustrated in FIG. 3A, computing system 354 illustrated in FIG. 3B, and computing device 400 illustrated in FIG. 4.

At 502, an instruction to establish a temporary password for logging-in to a particular user account for a selected on-line service is received. For example, such an instruction may be received as a consequence of a user providing input to a user device requesting that temporary passwords be established for the user's accounts with one or more different on-line services.

Responsive to receiving the instruction to establish the temporary password for the particular user account for the selected on-line service, a program that corresponds to the selected on-line service and that is executable to log-in to a user account for the selected service and to change a password for user account is identified at 504.

In some implementations, a computer memory storage system may store a collection of different programs, each of which corresponds to and is executable to log-in to a user account and change a password for a specific on-line service, and the appropriate program is identified from among the collection based upon the selected on-line service for which a temporary password is to be established. In such implementations, the various different protocols for logging-in to and changing passwords for user accounts for the different on-line services may be known, and each program may be executable to follow the specific protocol for logging in-to and changing a password for a user account for the specific on-line service to which it corresponds. This may involve sending a specific series of hypertext transfer protocol (HTTP) POST and GET requests in accordance with the specific protocol for logging-in to and changing a password for a user account for the specific on-line service.

For example, a program corresponding to a specific on-line service may be configured to generate and send an HTTP GET request specifying the network address for the specific on-line service in order to connect to the specific on-line service and initiate the process of changing the password of a user account for the specific on-line service. Then, in order to log-in to a user account for the specific on-line service, the program may be configured to generate and send one or more HTTP POST requests (e.g., for completing one or more form elements) to the specific on-line service according to the protocol for logging-in to a user account for the specific on-line service in order to provide the on-line service with, among other information, an account identifier (e.g., user name) and a user password for the on-line account. Upon a successful log-in to the user account, the program also may be configured to generate and send one or more additional HTTP GET requests to the specific on-line service in order to navigate to the appropriate location for changing the password for the user account. Thereafter, in order to change the password for the user account for the specific on-line service, the program may be configured to generate and send one or more HTTP post requests (e.g., for completing one or more form elements) to the specific on-line service according to the protocol for changing a password for a user account for the specific on-line service in order to provide the on-line service with, among other information, the new password for the user account.

In alternative implementations, the computer memory storage system may not store individual programs for logging-in to and changing password passwords for user accounts for each on-line service. Instead, multiple of the on-line services may be known to follow the same protocols for logging-in to and changing passwords for user accounts, and the computer memory storage system may store a collection of programs that correspond to and are executable to log-in to and change passwords for user accounts for classes of on-line services that share the same protocols for logging-in to and changing passwords for user accounts. In such implementations, the program corresponding to the appropriate class of on-line service may be identified from among the collection of programs based upon the selected on-line service for which a temporary password is to be established.

At 506, stored data corresponding to the selected on-line service and/or the particular user account for the selected on-line service is identified. This may involve, for example, accessing, among other data, an indication of the network address (e.g., URL) for the selected on-line service, the account identifier (e.g., user name) for the particular user account, and/or the existing password for the particular user account.

At 508, a new password is generated for the particular user account, and, at 510, the newly-generated password is stored in a computer memory storage system. In some implementations, a random character generator may be employed in order to generate the new password for the particular user account. Additionally or alternatively, in some implementations, a policy for forming valid passwords for user accounts for the selected on-line service may be consulted, and the new password for the user account may be generated in compliance with the consulted policy. In any event, the newly-generated password may be arbitrary, for example bearing no dependence on the particular user account or the user with whom the particular user account is associated, so as to make the newly-generated password more difficult for a hacker to guess.

At 512, the program identified at 504 is executed and the data identified at 506 is used to log-in to the particular user account with the selected on-line service and change the existing password for the particular user account to the newly-generated password for the particular user account. In addition, at 514, the newly-generated password for the particular user account with the selected on-line service is displayed (or otherwise provided) to the user with whom the account is associated. In implementations in which the process illustrated in the flowchart 500 of FIG. 5 is performed by a personal computing device of the user, the newly-generated password may be displayed directly on a display device associated with the personal computing device of the user. In implementations in which the process is performed by a host computing system (e.g., a server), the host computing system may transmit an indication of the newly-generated password to a device of the user for display and/or audible rendering by the device.

At 516, the process waits for a condition to trigger reversion of the newly-generated password for the particular user account to the previously-existing password for the particular user account. In some implementations, a period of time may be defined (e.g., by the requesting user or by the system), and the condition to revert the newly-generated password for the particular user account for the selected on-line service to the previously-existing password for the particular user account for the selected on-line service may be triggered by the defined period of time elapsing after the change of the previously-existing password for the particular user account for the selected on-line service to the newly-generated password for the particular user account for the selected on-line service. In alternative implementations, the condition to trigger reversion of the newly-generated password for the particular user account for the selected on-line service to the previously-existing password for the particular user account for the selected on-line service may be receipt of a user instruction to revert the password for the particular user account for the selected on-line service to the previously-existing password for the particular user account for the selected on-line service.

At 518, the process determines if the condition has been triggered. If the condition has not been triggered, the process returns to 516 and continues to wait for the condition to be triggered. Alternatively, if the condition has been triggered, the process proceeds to 520 where the program identified at 504 is executed and the newly-generated password for the particular user account for the selected on-line service is used to log-in to the particular user account with the selected on-line service and change the newly-generated password for the particular user account back to the previously-existing password for the particular user account.

Then, at 522, the process determines if the change of the password for the particular user account with the selected on-line service back to the previously-existing password for the particular user account with the selected on-line service was successful. Among other reasons, the password change may be unsuccessful if the selected on-line service does not allow a user account to be logged-in to from two devices at the same time, and the user with whom the particular user account is associated remains logged-in to the particular user account from another device using the newly-generated password. If that is the case, attempts to change the password for the particular user account for the selected on-line service may have to be repeated until the user with whom the particular user account is associated has logged-out of the particular user account from the other device.

If it is determined that the password change was unsuccessful, the process returns to 520, and the password change is attempted again. Alternatively, if it is determined that the password change was successful, the process ends.

Figure 6:
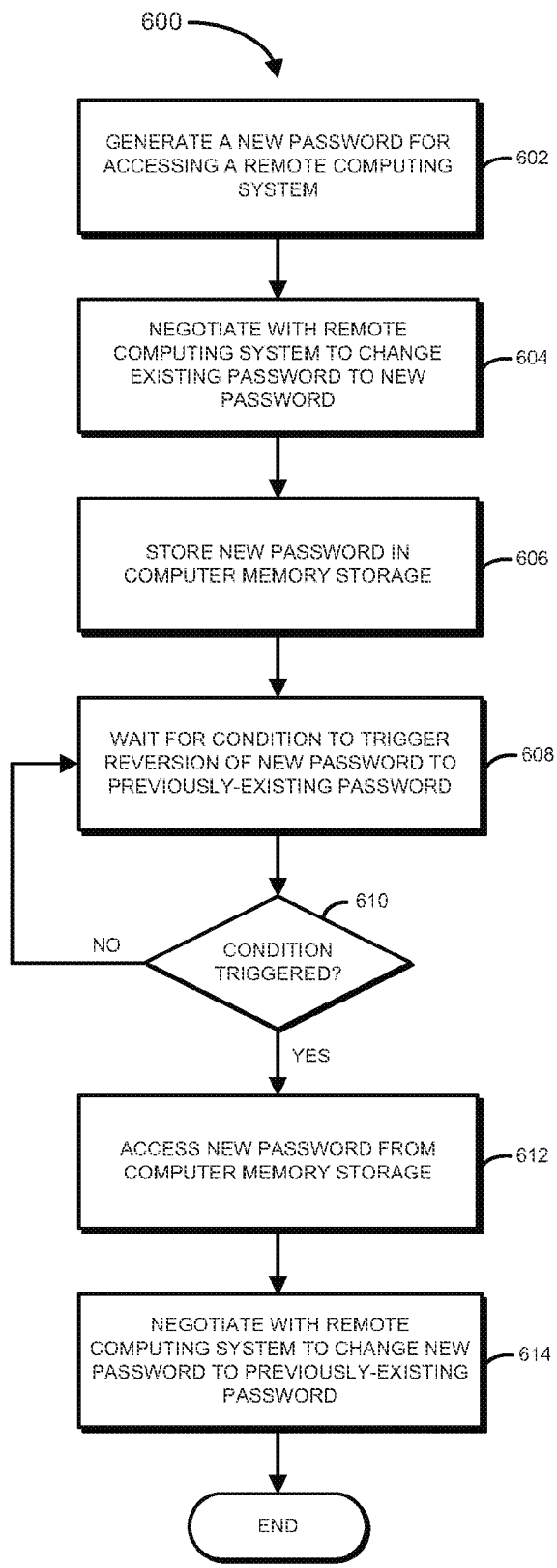

FIG. 6 is a flowchart 600 illustrating an example of a process for changing passwords for a user account for an on-line service. The process illustrated in the flowchart 600 of FIG. 6 may be performed by a computing system such as the trusted user device 302 illustrated in FIG. 3A, computing system 354 illustrated in FIG. 3B, and computing device 400 illustrated in FIG. 4.

At 602, a new password for accessing a remote computing system is generated. For example, the new password for accessing the remote computing system may be generated in response to receipt of a user request to establish a temporary password for accessing the remote computing system. At 604, an automated negotiation with the remote computing system is executed to change the existing password for accessing the system to the newly-generated password for accessing the system. In addition, at 606, the new password is stored in computer memory storage.

At 608, the process waits for a condition to trigger reversion of the newly-generated password for accessing the remote computing system to the previously-existing password for accessing the remote computing system. In some implementations, the condition to trigger reversion of the password to the previously-existing password for accessing the remote computing system may be that a predefined period of time has elapsed since changing the password for accessing the remote computing system to the newly-generated password. In alternative implementations, the condition to trigger reversion of the password to the previously-existing password for accessing the remote computing system may be receipt of a user request to do so.

At 610, the process determines if the condition has been triggered. If the condition has not been triggered, the process returns to 608 and continues to wait for the condition to be triggered. Alternatively, if the condition has been triggered, the process proceeds to 612 where the newly-generated password for accessing the remote computing system is accessed from the computer memory storage system. Thereafter, at 614, the accessed, newly-generated password is used to execute another automated negotiation with the remote computing system to change the newly-generated password for accessing the remote computing system back to the previously-existing password for accessing the remote computing system.

Figure 7:
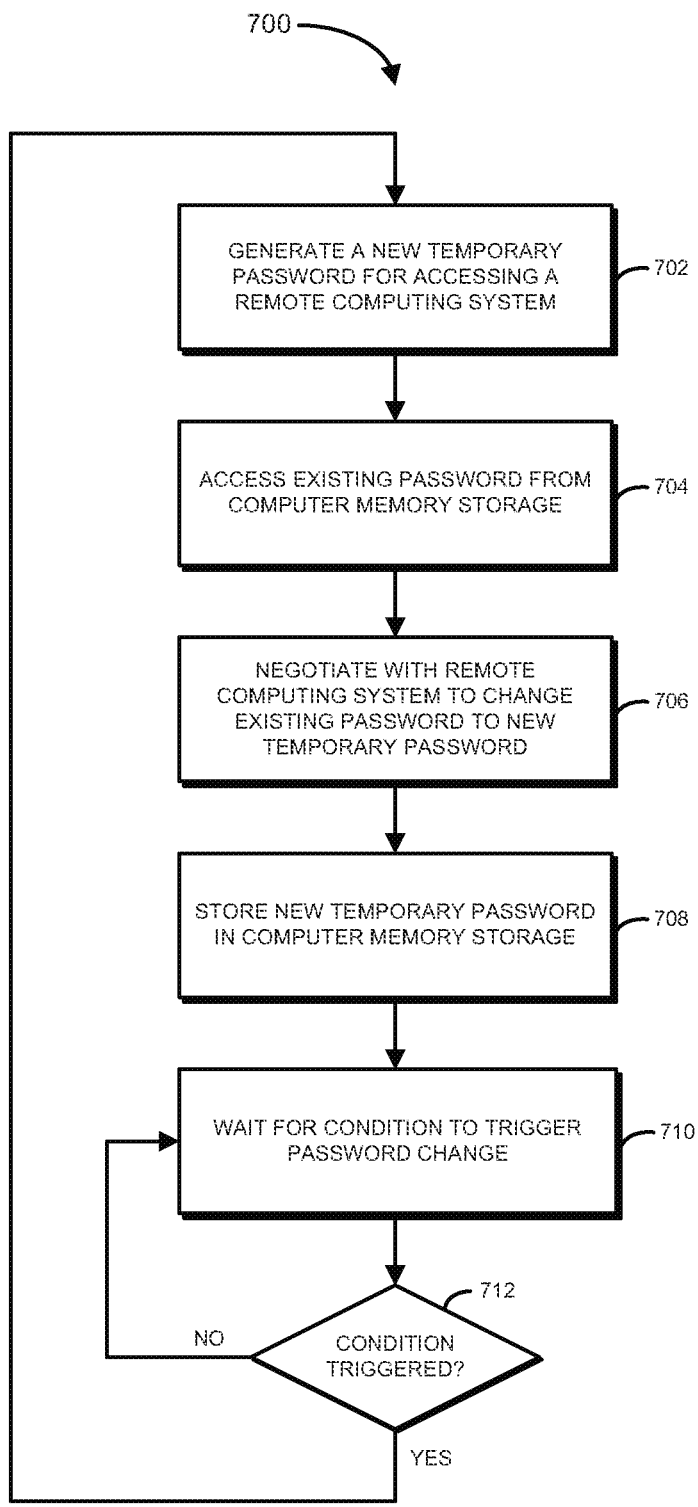

FIG. 7 is a flow chat 700 illustrating an example of a process for changing passwords for a user account for an on-line service. The process illustrated in the flowchart 700 of FIG. 7 may be performed by a computing system such as the trusted user device 302 illustrated in FIG. 3A, computing system 354 illustrated in FIG. 3B, and computing device 400 illustrated in FIG. 4.

At 702, a new temporary password for accessing a remote computing system is generated. Then, at 704, the existing password for accessing the remote computing system is accessed from computer memory storage and, at 706, the existing password for accessing the remote computing system is used to execute an automated negotiation with the remote computing system to change the existing password for accessing the remote computing system to the newly-generated temporary password for accessing the remote computing system. The temporary password for accessing the remote computing system then is stored in computer memory storage at 708.

At 710, the process waits for a condition to trigger a change of the temporary password for accessing the remote computing system to a new temporary password for accessing the remote computing system. In some implementations, the condition to trigger a change of the password to a new temporary password for accessing the remote computing system may be that a predefined period of time has elapsed since changing the password for accessing the remote computing system. In alternative implementations, the condition to trigger change of the password may be receipt of a user request to do so. At 712, the process determines if the condition has been triggered. If the condition has not been triggered, the process returns to 710 and continues to wait for the condition to be triggered. Alternatively, if the condition has been triggered, the process returns to 702 where another new, temporary password for accessing the remote computing system is generated. In this manner, the password for accessing the remote computing system is repeatedly transitioned to new, temporary passwords.

A number of methods, techniques, systems, and apparatuses have been described. However, additional implementations are possible and contemplated by this disclosure. For example, although the above discussion often describes a password changing application executing on a personal computing device of a user or executing on a host computer that is accessible to a personal computing device of a user over an Internet connection, in some implementations, in order to initiate the establishment of a temporary password for a user account for an on-line service, a user may use a mobile or landline telephone to dial a specific telephone number corresponding to a host computer on which a password protection service is executing. Upon successful establishment of a telephone call connection between the user's mobile or landline telephone and the host computer, the user may enter a personal identification number (PIN) and/or some other form of identifying input, for example using spoken commands and/or the telephone keypad. The password protection service may recognize the PIN and/or other identifying input as corresponding to the user and/or a particular account for an on-line service of the user. In response, the password protection service executing on the host computer may generate a new password for a user account for an on-line service of the user and negotiate with the computer system hosting the on-line service to change the existing password for the user account to the newly-generated password. In addition, the password protection service executing on the host computer may transmit an indication of the newly-generated password to the user's mobile or landline telephone. For example, the password protection service executing on the host computer may transmit the newly-generated password to the user's mobile or landline telephone as an SMS text message. Additionally or alternatively, the password protection service executing on the host computer may use a text-to-speech application to convert the newly-generated password into a spoken indication of the newly-generated password and, then, transmit the spoken indication of the newly-generated password to the user's mobile or landline telephone over a telephone call connection established with the user's mobile or landline telephone.

The described methods, techniques, systems, and apparatuses may be implemented in digital electronic circuitry or computer hardware, for example, by executing instructions stored in computer-readable storage media.

Apparatuses implementing these techniques may include appropriate input and output devices, a computer processor, and/or a tangible computer-readable storage medium storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and the desired results still may be achieved. Similarly, components in the disclosed systems may be combined in a different manner and/or replaced or supplemented by other components and the desired results still may be achieved.

What is claimed is:

1. A non-transitory computer readable medium storing instructions which when executed by at least one processor cause a trusted computing device to:
    arbitrarily generate a new password for accessing a remote computing system to which access is regulated by a password;
    negotiate, with the remote computing system, to change an existing password, used for accessing the remote computing system, to the new password, wherein a user is to access the remote computing system using the new password via an untrusted computing device;
    store an indication of the new password in a computer memory storage system;
    detect occurrence of a condition to trigger reversion of the new password to the previously-existing password, wherein the condition is detected in response to receiving an indication that the user desires the new password to be expired;
    access the stored indication of the new password from the computer memory storage system; and
    negotiate, with the remote computing system, to change the new password to the previously-existing password as a consequence of having detected the occurrence of the condition responsive to receiving the indication that the user desires the new password to be expired.

2. The non-transitory computer readable medium of claim 1 wherein the instructions to cause the trusted computing device to negotiate to change the existing password to the new password include instructions to cause the trusted computing device to:
    identify from among a collection of different sets of computer-executable instructions for causing different computing systems to change passwords used to access the different computing systems stored in a computer memory storage system, a particular set of computer-executable instructions as being a set of computer-executable instructions for causing the remote computing system to change a password for accessing the remote computing system; and
    execute the identified set of computer-executable instructions to change the existing password for accessing the remote computing system to the new password.

3. The non-transitory computer readable medium of claim 1 wherein the instructions to cause the trusted computing device to negotiate to change the new password to the previously-existing password include instructions to cause the trusted computing device to:
    identify from among a collection of different sets of computer-executable instructions for causing different computing systems to change passwords used to access the different computing systems stored in a computer memory storage system, a particular set of computer-executable instructions as being a set of computer-executable instructions for causing the computing system to change a password for accessing the computing system; and
    execute the identified set of computer-executable instructions to change the new password to the previously-existing password.

4. The non-transitory computer readable medium of claim 1 wherein the instructions to cause the trusted computing device to:
    detect occurrence of a condition to trigger reversion of the new password to the previously-existing password include instructions to cause the trusted computing device to detect that a pre-defined period of time has elapsed since the previously-existing password was changed to the new password; and
    negotiate, with the remote computing system, to change the new password to the previously-existing password as a consequence of having detected the occurrence of the condition include instructions to cause the trusted computing device to, with the remote computing system, to change the new password to the previously-existing password as a consequence of having detected that the pre-defined period of time has elapsed since the previously-existing password was changed to the new password.

5. The non-transitory computer readable medium of claim 4 further comprising instructions to cause the trusted computing device to receive an indication of a user-selected period of time after which to revert the new password to the previously-existing password, wherein the instructions to cause the trusted computing device to detect that a pre-defined period of time has elapsed since the previously-existing password was changed to the new password include instructions to cause the trusted computing device to detect that the period of time selected by the user has elapsed since the previously-existing password was changed to the new password.

6. The non-transitory computer readable medium of claim 1 wherein the instructions to cause the trusted computing device to negotiate, with the remote computing system, to change the new password to the previously-existing password include instructions to cause the trusted computing device to:
    transmit, to the remote computing system, an access request and the new password;
    receive, from the remote computing system responsive to having transmitted the access request and the new password, an indication that access to the remote computing system has been granted to the trusted computing device; and as a consequence of having received the indication that access to the remote computing system has been granted, execute a set of computer-executable instructions for causing the remote computing system to change a password for accessing the remote computing system to change the new password to the previously-existing password.

7. The non-transitory computer readable medium of claim 1 wherein the instructions to cause the trusted computing device to negotiate, with the remote computing system, to change the new password to the previously-existing password include instructions to cause the trusted computing device to:

transmit, to the remote computing system, an access request and the new password;

receive, from the remote computing system responsive to having transmitted the access request and the new password, an indication that the remote computing system has denied access to the computing device;

as a consequence of having received the indication that the remote computing system has denied access to the trusted computing device, retransmit, to the remote computing system, the access request and the new password;

receive, from the remote computing system responsive to having retransmitted the access request and the new password, an indication that access to the remote computing system has been granted to the trusted computing device; and as a consequence of having received the indication that access to the remote computing system has been granted, execute a set of computer-executable instructions for causing the remote computing system to change a password for accessing the remote computing system to change the new password to the previously-existing password.

8. The non-transitory computer readable medium of claim 7 wherein the instructions to cause the trusted computing device to retransmit the access request and the new password include instructions to cause the trusted computing device to repeatedly transmit, to the remote computing system, the access request and the new password until the indication that access to the remote computing system has been granted is received.

9. The non-transitory computer readable medium of claim 1 further comprising instructions to cause the trusted computing device to:

store an indication of the existing password; and process an instruction to establish a temporary password for accessing the remote computing system, wherein:

the instructions to cause the trusted computing device to negotiate to change the existing password to the new password are triggered by the processing of the instruction to establish the temporary password for accessing the remote computing system and include instructions to cause the trusted computing device to:

access the stored indication of the existing password, and based on having accessed the stored indication of the existing password, transmit the existing password to the remote computing system; and the instructions to cause the trusted computing device to negotiate to change the new password to the previously-existing password using the accessed indication of the new password include instructions to cause the trusted computing device to:

access the stored indication of the previously existing password, and based on having accessed the stored indication of the previously-existing password, transmit the previously-existing password for accessing the remote computing system to the remote computing system.

10. The non-transitory computer readable medium of claim 1 further comprising instructions to cause a display of the new password to a user of the remote computing system.

11. The non-transitory computer readable medium of claim 1 wherein the instructions to cause the trusted computing device to arbitrarily generate the new password include instructions to cause the trusted computing device to use a random character generator to generate the new password.

12. The non-transitory computer readable medium of claim 1 wherein the instructions to cause the trusted computing device to:

negotiate to change an existing password for accessing the remote computing system to a new password for accessing the remote computing system include instructions to cause the trusted computing device to negotiate to change an existing password for accessing a particular user account hosted by the computing system to a new password for accessing the particular user account hosted by the computing system;

detect occurrence of a condition to trigger reversion of the new password to the previously-existing password include instructions to cause the trusted computing device to detect occurrence of a condition to trigger reversion of the new password for accessing the particular user account hosted by the remote computing system to the previously-existing password for accessing the particular user account hosted by the remote computing system;

access the stored indication of the new password from the computer memory storage system include instructions to cause the trusted computing device to access the stored indication of the new password for accessing the particular user account hosted by the remote computing system from the computer memory storage system; and negotiate to change the new password to the previously-existing password include instructions to cause the trusted computing device to negotiate to change the new password for accessing the particular user account hosted by the remote computing system to the previously-existing password for accessing the particular user account hosted by the remote computing system.

13. A non-transitory computer-readable storage medium storing instructions that, when executed by a trusted computing device, cause the trusted computing device to:

detect occurrence of a first condition to trigger a change of an existing password for logging-in to a particular user account for a particular service that is hosted by a remote computing system;

responsive to detecting occurrence of the first condition, identify, from among a collection of computer programs, each of which corresponds to at least one specific service hosted by some remote computing system and is executable to automatically log-in to a user account for the corresponding service and to change a password for logging-in to the user account, a particular computer program as corresponding to the particular service and being executable to automatically log-in to a user account for the particular service and to change a password for logging-in to the user account;
access an indication of the existing password stored in a computer memory storage system;
generate a temporary password for accessing the particular user account for the particular service;
store an indication of the temporary password in a computer memory storage system;
execute the particular program identified as corresponding to the particular service to automatically log-in to the particular user account for the particular service using the accessed indication of the existing password and change the existing password for logging-in to the particular user account to the temporary password;
provide an indication of the temporary password to a user associated with the particular account, wherein the user is to access the particular account using the temporary password via an untrusted computing device;
detect occurrence of a second condition to trigger a change of the temporary password to the previously-existing password, wherein the second condition is detected in response to receipt of an indication that the user desires the temporary password to be expired; and
as a consequence of having detected the occurrence of the second condition responsive to the receipt of the indication that the user desires the temporary password to be expired, execute the particular program identified as corresponding to the particular service to automatically log-in to the particular user account for the particular service using the stored indication of the first temporary password and change the temporary password to the previously-existing password.

14. A system comprising:
one or more processing elements; and
a computer memory storing:
  a computer program executable to automatically log-in to a user account for an on-line service and change a password for logging-in to the user account;
  collections of data, each of which is associated with a specific on-line service hosted by some remote computing system; and
  instructions that, when executed by the one or more processing elements, cause the one or more processing elements to:
    process a received instruction to establish a temporary password for logging-in to a particular user account for a particular on-line service that is hosted by a remote computing system in place of an existing password for logging-in to the particular user account;
    responsive to processing the received instruction to establish a temporary password for logging-in to the particular user account for the particular on-line service:
      identify, from among the stored sets of data, a particular set of data as being associated with the particular on-line service,
      generate a new password to be used for accessing the particular user account for the particular service,
      store an indication of the new password in the computer memory storage system,
      execute the stored computer program to automatically log-in to the particular user account for the particular service using data from the particular set of data and change the existing password for logging-in to the particular user account to the new password, and
      provide an indication of the new password to a user associated with the particular account, wherein the user is to access the particular account using the new password via an untrusted computing device;
    detect occurrence of a condition to trigger reversion of the new password to the previously-existing password, wherein the condition is detected in response to receipt of an indication that the user desires the new password to be expired; and
    as a consequence of having detected the occurrence of the condition responsive to the receipt of the indication that the user desires the temporary password to be expired, execute the stored computer program to automatically log-in to the particular user account for the particular service using data from the particular set of data and the stored indication of the new password and change the new password to the previously-existing password.

* * * * *

UNITED STATES PATENT AND TRADEMARK OFFICE
CERTIFICATE OF CORRECTION

Page 1 of 1

PATENT NO. : 8,826,398 B2
APPLICATION NO. : 13/248494
DATED : September 2, 2014
INVENTOR(S) : Alan H Karp It is certified that error appears in the above-identified patent and that said Letters Patent is hereby corrected as shown below:

Title Page, Item (56) References Cited

OTHER PUBLICATIONS, second reference citation, line 3, delete "doesfacebook_havetemporary_" and insert -- does_facebook_have_temporary_ --, therefor.

In the Drawings

In sheet 1 of 10, in the Conversation Bubble, delete "temporaray" and insert -- temporary --, therefor.

In the Claims

In column 19, line 30, in Claim 13, after "the" delete "first".

Signed and Sealed this
Twenty-third Day of February, 2016

Michelle K. Lee
*Director of the United States Patent and Trademark Office*